United States Patent Office 3,353,022
Patented Nov. 14, 1967

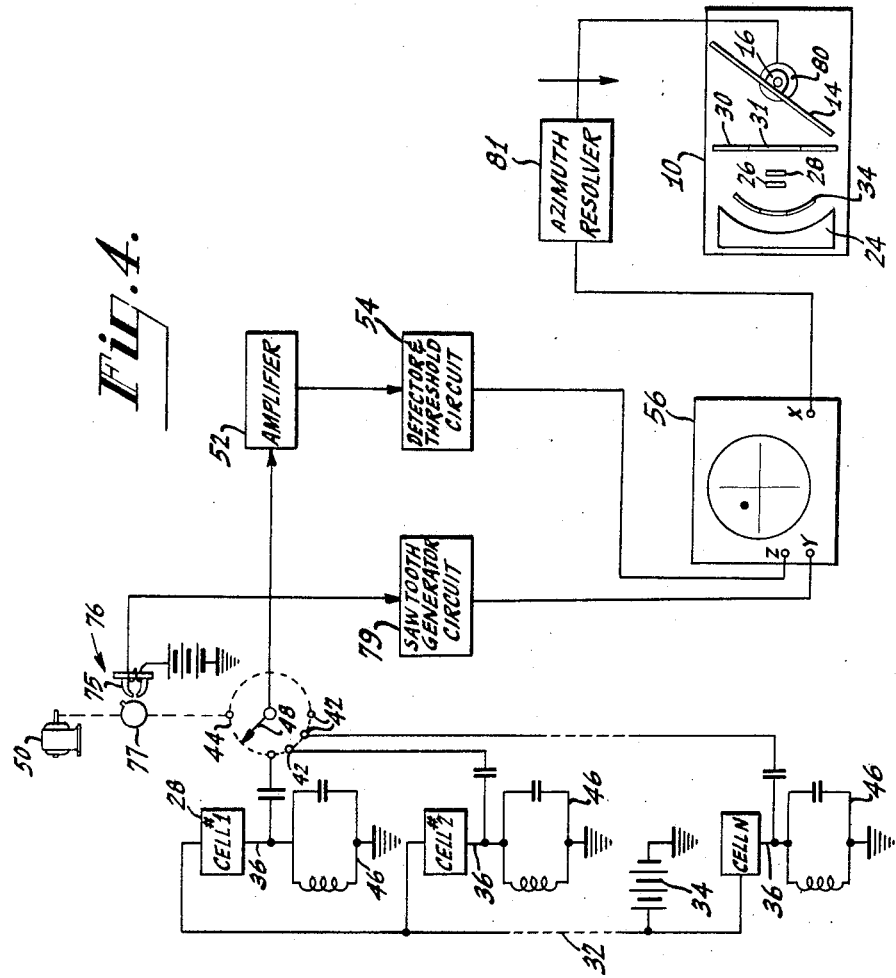
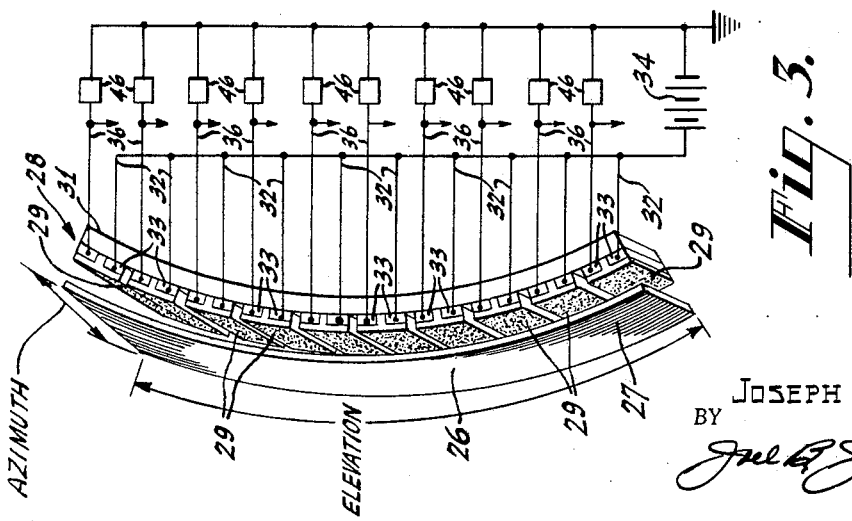

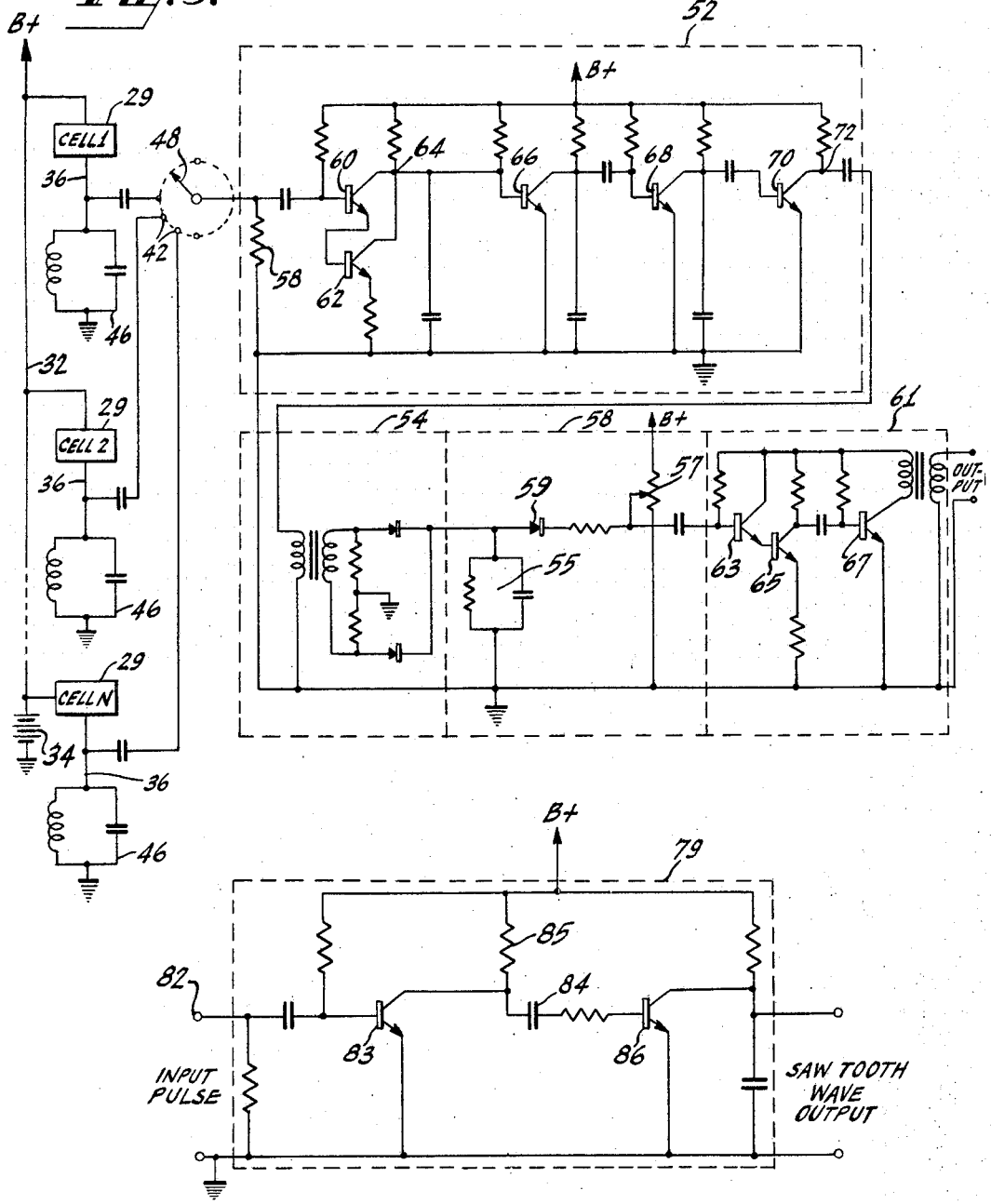

3,353,022
INFRARED SEARCH SYSTEM COMPRISING MEANS FOR DIFFERENTIATING BETWEEN TARGET AND BACKGROUND RADIATION
Joseph Schwartz, Teaneck, N.J., assignor, by mesne assignments, to Avion Electronics, Incorporated, Wilmington, Del., a corporation of Delaware
Filed Jan. 29, 1959, Ser. No. 789,958
2 Claims. (Cl. 250—83.3)

The invention is directed to a search system and specifically to infrared sensitive search equipment for detecting distant objects.

In the detection of aerial objects, in the infrared band from 1.8 to 2.7 microns, there is a considerable problem in differentiating between unwanted targets and background noise, which emits radiations in the same radiation bandwidth. An infrared search device, used for scanning a field of view above the horizon, detects considerable infrared radiation from 2 to 2.7 micron range. A clear sky will radiate with an energy density of 15 to 50 microwatts per square centimeter per steradian. Scattered clouds will emit energy in this wave length having a density up to 150 microwatts per square centimeter per steradian. An overcast sky will have a radiation density of between 15 to 25 microwatts per square centimeter per steradian, while ground objects will emit an energy density of around 150 microwatt per square centimeter per steradian. Such background radiation can result in a false target signal due to a discontinuity, or gradient, having such a shape to cause a change of intensity on the infrared sensitive device. Thus, it is necessary for a search system, sensitive in this radiation range, to be able to differentiate the energy emitted by background objects from that emitted by the target.

Another major requirement of such a detecting system is that of achieving sufficient resolution to permit rejection of background signals. It may be considered that the desired targets to be detected are sufficiently small to be considered point sources. A detecting device defined on this assumption is one which can reject undesired targets such as clouds which, because of their extended areas as distinguished from a point source of energy, can be eliminated from detection.

It is, therefore, an object of this invention to provide a novel infrared detecting system which possesses sufficient spacial resolution to reject undesired targets.

It is another object of the invention to provide a novel infrared detecting system, which is sufficiently sensitive to desired target detection with the ability to eliminate background detection.

It is a further object of the invention to provide a novel infrared detecting device which achieves sufficient radiation sensitivity to differentiate between desired targets and background radiation.

It is another object of the invention to provide a novel search system having a relatively simple structure and of light weight.

The novel search system of the invention is one utilizing a bank of infrared sensitive cells, in front of which is mounted a reticle having alternate transparent and opaque lines extending across the bank of cells. Radiation from a field of view is caused to strike an oscillating plane mirror, which scans the radiation over the surface of a concave spherical mirror, adjacent to the focal point of which is mounted the bank of photosensitive cells. Radiation from the concave mirror is in this manner projected onto one of the bank of photosensitive cells to provide a modulated light signal. The output of the cell is amplified and compared with a pickoff signal to determine both the azimuth and the elevation of the target.

FIG. 3 is a perspective view of the lined reticle and bank of photosensitive cells used in the search unit of FIG. 1.

FIG. 4 is a schematic block diagram of the detecting system in accordance with the invention.

FIG. 5 is a diagram of the amplifier and detector circuits of the system of FIG. 4.

FIG. 6 is a circuit diagram of a saw tooth generator circuit used in the system of FIG. 4.

Figure 1:
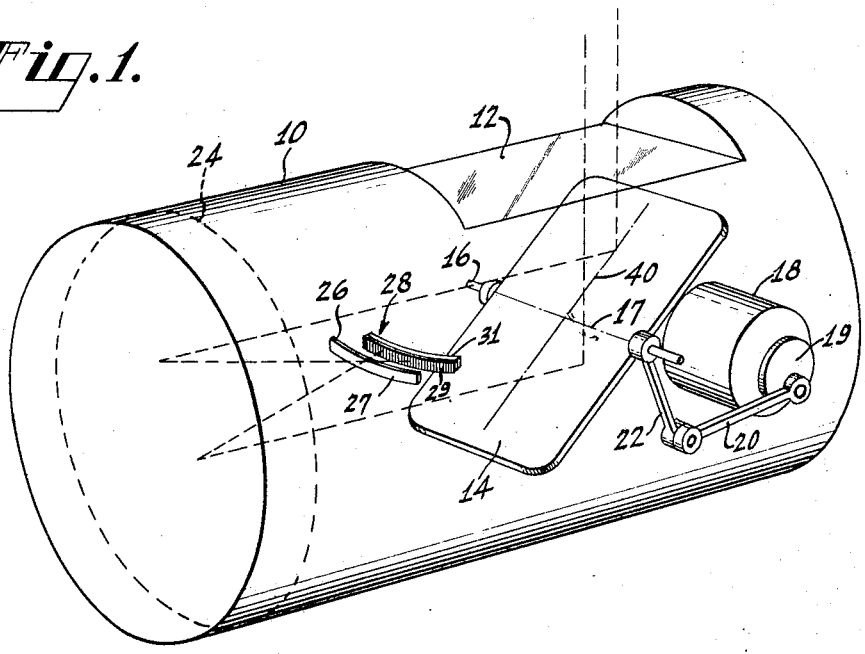
FIG. 1 is a perspective view of the search unit of the system of FIG. 4.

The mechanical and optical portions of the search system are shown schematically in FIG. 1. The electrical portions of the system are not disclosed in FIG. 1, for the purposes of simplification but are disclosed in others of the figures and will be fully described below.

The search system is enclosed in a housing 10 in FIG. 1 which includes a window portion 12 positioned across an opening formed in a side of the housing 10. The window 12 is of any appropriate material such as glass or quartz, which is transparent to infrared radiation between 1.8 to 2.7 microns. Positioned within housing 10 and aligned with the window 12 is a flat plane mirror 14. The mirror 14 is mounted on and supported by a shaft 16. A bearing structure rotatably supporting shaft 16 is not shown in FIGURE 1, for the purpose of simplifying the drawing. However, it is to be understood that the mirror 14 may be oscillated by the shaft 16, which is caused to move in this manner by an electric motor 18 driving a wheel 19 connected to shaft 16 by linkage arms 20 and 22. Arm 20 is eccentrically connected to wheel 19 to provide the oscillating motion.

Spaced from mirror 14 is a concave spherical mirror 24 which is mounted in a plane parallel to the axis of oscillation of mirror 14 about its shaft 16. The reflecting concave surface of mirror 24 is directed toward mirror 14. The arrangement of mirrors is shown in both FIGS. 1 and 2. Positioned between the mirrors and substantially at the focal point of the spherical lens 24 is a reticle structure 26 and a bank 28 of photosensitive cells 29. Reticle 26 is very closely spaced from the bank of cells 28 and between the cells and the spherical mirror 24. As disclosed in more detail in FIG. 2, the optical system of the search unit also consists of an infrared opaque diaphragm 30 having a central aperture 31 for defining the field of view reflected by the plane mirror 14. A filter 32 is positioned across aperture 31 to confine radiation between mirrors 14 and 24 to the desired wave length. A spherical correcting lens 34 may also be provided to properly direct light from mirror 14 onto the concave reflecting mirror 24 so that the light will be brought to focus on the reticle 26.

Figure 2:
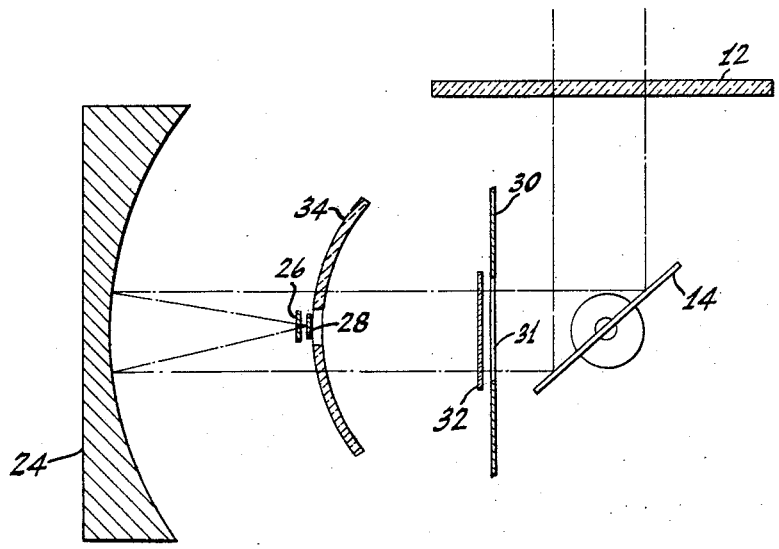
FIG. 2 is a schematic representation of the optics used in the search unit of FIG. 1.

The optical configuration shown in FIG. 2 is that of a concentric catadioptric system, which uses only spherical surfaces consisting of mirror 24, the concentric correcting lens 34, and the concentric image surface of reticle 26. The diaphragm 30 is located in the plane of the center of curvature of the system so as to cause all rays to be meridianal. The spherical shape of the several optical/elements also provides a simplicity of fabrication.

The reticle 26 is shown in detail in FIG. 3 and consists of a curved plate of glass or quartz, transparent to infrared radiations of the type to be detected. On the convex surface of the reticle 26, there is formed by ruling or printing a plurality of spaced lines 27 which are opaque to the infrared radiation. In one application of the search unit, the lines are ruled with a spacing of 0.07 mm., parallel to each other and to the curved edges of the reticle 26. The reticle is mounted in the optical system of FIG. 2 and, as also shown in FIG. 1, concentrically with the concave surface of mirror 24 and substantially at the image plane of the mirror 24. The reticle 26 is positioned such that the ruled lines 27 extend substantially parallel to the axis 17 about which mirror 14 oscillates.

Closely spaced from the reticle 26 is the bank 28 of photosensitive cells 29. The cells are each formed on a dielectric support structure 31 (FIG. 3) and are positioned contiguous to each other to form a continuous bank of individual cells. The support structure 31 is formed in a curve to match the curvature of the reticle 26, so that the cells are arranged concentrically with both the reticle 26 and mirror 24. Formed beneath each cell 29 and on the surface of support 31 are a pair of spaced conductive electrode strips 33, which are bridged by the supported cell 29. Alternate ones of the conductive electrode strips 33 are connected together forming two groups, with one group connected by conductors 32 to the positive terminal of a voltage source 34. The other group of conductive terminal strips are connected by leads 36 to the other terminal of the voltage source 34. This circuit arrangement provides a voltage difference across each cell 29. The photoconductive cells 29 may be of any appropriate infrared sensitive material such as photoconductive lead sulfide or lead telluride. The conductive terminal strips 30 are formed of any appropriate conductive material such as metal films of silver or copper, for example, while the dielectric support 31 may be glass or an equivalent material.

Referring to FIG. 1, the angle through which the mirror 14 oscillates is considered as the azimuth of the field of view. The total azimuth angle, which mirror 14 scans may be selected within usable limits. One device, of the type described, has an azimuth angle of 90°. Reticle 26 and a bank 28 of thirty cells are positioned substantially in a plane normal to that of the azimuth angle. A beam of light, thus, striking mirror 14 will be reflected onto the spherical surface of mirror 24 and focused onto the reticle 26. Oscillation of mirror 14 about shaft 16 causes the light beam to scan across the surface of mirror 24 and across the lines of reticle 26 in a path normal to the reticle lines. The scanned light passing through reticle 26 will fall sequentially along a line extending across one of the cells 29 and normal to the direction of the aligned cells. The size of each cell 29 in the device comprises a width of one millimeter in the direction of the aligned cells and a height of two millimeters in the direction normal to the reticle lines 27.

A light beam from an infinitely distant target and reflected from mirrors 14 and 24 onto one of the cells 29 will remain on the cell only for 3° of the azimuth angle of mirror 14. During this time, however, the reflected radiation from the mirrors traverses across the reticle 26 at the speed of oscillation of mirror 24. Light passes through the transparent line portions of reticle 26 to fall as a chopped or interrupted light pattern on one of the cells 29. This provides in the circuit 36 of the cell an electrical pulse, whose frequency is determined by the speed that the light crosses the opaque lines 27 of reticle 26. An arbitrary chopping frequency of 8 cycles per degree of angular movement of the light beam striking the cell 29 is used. The speed of oscillation of mirror 14 is also arbitrarily selected at 1.5 seconds per scan giving a scanning rate of 60° per second and thus a scanning rate at each cell 29 equal to 120° per second. The selected frequency value of 8 cycles per degree would require, with the scanning rate of 120° per second at each cell, a chopping frequency of 960 c.p.s.

The optical system of mirror 24, in the device described, is one which will provide a resolution at its image plane of 1/20 degree. Radiation from an infinitely distant target is imaged on the cell surface in a spot covering approximately 0.005 millimeter. Reticle 26 is formed with 60 alternate opaque and transparent lines. Each opaque line 27 of the reticle is spaced from the two adjacent lines on either side a distance equal to 0.07 millimeter. Since the light ray stays on each cell 29 approximately 0.025 second, a sufficient number of the opaque lines 27 of the reticle are scanned by the light beam to provide the desired frequency in the neighborhood of 960 c.p.s.

The dimension of mirror 14 normal to the plane of azimuth scan, and which is parallel to shaft 16, provides the elevation portion of the field of view scanned. An arbitrary elevation angle of 40° is selected for the device described as that which would be adequate for most applications in which the device is to be used. Mirror 14 (FIG. 1) may be considered divided by a central line 40, such that a light beam striking anywhere on line 40 will be reflected to a center region of the image plane of mirror 24 and will strike the center cell 29 of the aligned cells. Light striking to one side of line 40 will be directed by the optics of mirror 24 to a cell on an opposite side of the center cell 29. Furthermore, the displacement from line 40 of light striking mirror 14 is directly proportional to the distance of the cell 29, to which the light is projected, from the center cell. Thus, a signal detected on any one of the aligned cells 29 can be calibrated as to elevation by determining which cell the light beam strikes.

Accordingly, as shown in FIG. 4, each of the conductors 36 connected to the respective cells 29 is capacitively coupled to one of the terminals 42 of a high speed mechanical commutator 44. Each of the cell circuits includes a tuned portion 46 consisting, as schematically indicated in FIG. 4 of an inductance and a capacitor in parallel. Each circuit portion 46 is tuned to the frequency of the pulsating current established in the cell by the scanning of the light beam across reticle 26. As stated above, this frequency may be in the order of 960 c.p.s. Each tuned circuit 46 provides high impedance to the tuned frequency, and thus, permits a storage or retention of the signal from the cell 29 between the times light is scanned across the cell. Furthermore, each tuned circuit 46 eliminates cell noise, since it confines the noise to the approximate value of the tuned frequency. In this manner, the storage function of each cell 29 enables the desired signal to build up to a maximum, since the signal is coherent and occurs at the tuned frequency. In contrast, noise at the same frequency will not be built up as rapidly since inherently noise is incoherent. The tuned circuits 46 connected to each cell 28 thus provide a means for increasing the signal-to-noise ratio of the system.

The commutator arm 48 is rapidly rotated to strike successively each of the commutator terminals 42. The commutator is driven by a motor 50 at a speed of 40 r.p.s. Since the commutator samples 30 cells per revolution, the commutation rate is 1200 samplings per second. At this rate the commutator obtains approximately 3/4 of a cycle of the 960 c.p.s. signal being commutated. The commutated signal is fed to an amplifier 52 whose output is lead into a detector circuit 54 to provide the appropriate voltage information used by an oscilloscope 56 for visual presentation.

FIG. 5 discloses the circuit details of the amplifier and detector circuits. The commutator arm 48 is loaded with a resistor 58, connected to ground, which "unloads" the tuned circuit 46 of the particular cell 28 being sampled. Commutator arm 48 is capacitively coupled to the base terminal of a transistor 60. The emitter of transistor 60 is connected to the base terminal of a second transistor 62, whose collector is connected to terminal 64 jointly with the collector or transistor 60. Thus, an amplified signal appears at 64, which is further amplified by three additional stages consisting of transistors 66, 68 and 70 and their associated circuits, respectively. The amplified signal from collector terminal 72 of transistor 70 is connected, by being capacitively coupled, to an inductive input of the detector circuit 54. A trap circuit 55 consisting of a capacitance and an inductance in parallel, and tuned to the chopping frequency of the light falling on cell 29, is connected between the output of detector circuit 54 and ground, to bypass unwanted frequencies, consisting mainly of noise. A threshold level for the signal is set by a circuit 58 comprising a variable resistor 57 connected between a source of B+ and the plate of a diode 59. An amplifying section 61, consisting of transistors 63, 65 and 67, provides sufficient voltage to supply the control grid of the oscilloscope of display unit 56.

The elevation sweep of the oscilloscope 56 is controlled by the position of the commutator arm 48, and is derived from a saw tooth generator circuit 79, shown in detail in FIG. 6. A synchronizing signal is derived from a pickoff device 76 (FIG. 4), which consists of an electromagnet 75, whose armature includes a gap, as shown. A wheel 77 having a single tooth is rotated adjacent to the armature gap to provide a pulse in the coil circuit of magnet 75. Wheel 77 is driven by motor 50 in synchronism with commutator arm 48.

The pulse generated by the pickoff device 75–76 is fed into a saw tooth generator and an amplifier circuit represented in FIG. 4 by the block 79. The specific details of the saw tooth generator circuit is disclosed specifically in FIG. 6. The input pulse is fed into the circuit through terminal 82 capacitively coupled to the base of a transistor 83, which has a grounded emitter. The collector circuit of transistor 83 includes a condenser 84, one side of which is charged up to a high potential by being connected through resistor 85 to a source of B+ potential. The arrival of the timing pulse at the base of transistor 83 decreases the emitter resistance and allows the capacitor 84 to quickly discharge to ground. The voltage built up and discharged in capacitor 84 has a saw tooth wave form, which is amplified by connecting the other side of capacitor 84 to the base of transistor 86, the output of which is an amplified saw tooth wave voltage. Voltage output is connected directly to the *y* deflection plates of the oscillograph tube of the oscilloscope 56 to provide frame scanning representing elevation on the oscillograph tube screen.

The azimuth position voltage which is applied to the deflection system of the oscilloscope of device 56 is derived from a precision potentiometer represented by 80 in FIG. 4. Potentiometer 80 is coupled directly to shaft 16 of the oscillating mirror 14. The voltage output from potentiometer 80 is fed to the amplifier 81 and into the *x* axis deflection plates of the oscilloscope 56.

A distinct advantage is obtained in the described search system in the use of a plurality of photosensitive cells rather than a single detector cell. It is recognized that an improvement in signal to noise is proportional to the square root of the number of detector elements. Thus the use of 30 cells in the system described results in an improvement in sensitivity of 5.5 times of a single cell scanning the full field in the same frame time. The described search system is one in which the optical arrangement can achieve sufficiently fine spacial resolution and allows adequate rejection of background signals. Thus since the desired target is considered as a point source in contrast to the larger images of undesired targets, the background noise is effectively reduced by making the elementary area of the detector system sufficiently small. Furthermore, the use of tuned portions of each cell circuit effectively reduces the noise bandwidth and improves the signal to noise ratio as set forth above.

The process of discrimination between a point source target and background radiation, from a cloud say, can now be explained in the same manner. Considering the effect on a single cell, as the projected radiation from essentially a point source target which covers a very small area is swept across the opaque lines of the reticle 26, pulses of energy are directed against the cell when the ray falls between opaque lines and energy is blocked when the ray is directed against an opaque line. The frequency of the pulses is the frequency of approximately 960 c.p.s. to which tank circuit 46 is tuned, hence the point source signal is stored.

Projected radiation from a cloud when directed against the reticle 26 spans a number of spaces between the opaque lines, so as the ray sweeps a given cell, there is always some incident energy on the cell at one time even though some of the span's area is shut off by the opaque lines, until the mirror has moved in azimuth to a point such that the reflected ray is above the cell boundary. Therefore instead of a series of pulses impinging on the cell at the chopping frequency, the cell experiences a relatively long gradual wave of energy at some frequency appreciably less than the chopping frequency. As tank circuit 46 offers a low impedance to the frequency of the relatively long wave, the cloud signal is by-passed. Hence background energy is discriminated against but point source target energy is detected.

The novel system has been described as that utilizing photoconductive cells sensitive to infrared radiation. It is clear that the system need not be limited to use in this particular region of the spectrum and may also utilize other types of sensitive cell devices or even phototubes, sensitive to visible light. Also the system has been described as that in which the information received by the system is utilized as a visual presentation on an oscilloscope. It is also possible to utilize the detected information in other ways, in which the signal information is represented visually or utilized to control or operate any appropriate device. It is recognized that the system has many applications other than those set forth above.

I claim:

1. A search system comprising a radiation sensitive device, means for collecting radiation from an optical field and for projecting said radiation along a path onto said radiation sensitive device, said radiation collecting and projecting means including a mirror mounted in said radiation path for oscillation about an axis, means for oscillating said mirror about said axis, said radiation sensitive device comprising a plurality of photosensitive cells aligned in a plane including said mirror axis, a reticle having alternately spaced linear radiation opaque and transparent portions extending substantially parallel to said aligned cells mounted between said aligned cells and mirror, a storage circuit connected individually to each cell, a display means, switching means for connecting the storage circuits to said display means in succession, and means responsive to said switching means and said means for oscillating the mirror for indicating on said display means two coordinates of a source of radiation.

2. A search system comprising a radiation sensitive device, means for collecting radiation from an optical field and for projecting said radiation along a path onto said radiation sensitive device, said radiation collecting and projecting means including a plane mirror mounted in said radiation path for oscillation about an axis and a spherical concave mirror mounted in said radiation path in a plane parallel to said plane mirror axis and between said plane mirror and said radiation sensitive device, means for oscillating said plane mirror about its axis, said radiation sensitive device comprising a plurality of contiguous photosensitive cells aligned in a plane including said mirror axis, a reticle having alternately spaced linear radiation opaque and transparent portions extending substantially parallel to said aligned cells and between said cells and said spherical mirror, said reticle being mounted substantially at the focal point of said spherical mirror and in position to intercept radiation reflected from said spherical mirror onto any one of said aligned cells, each of said cells extending transversely and across a plurality of said transparent portions of the reticle for producing a series of pulses in response to each oscillation of the plane mirror, a resonant circuit individually connected to each cell, said circuits being tuned to the repetition frequency of said pulses, a display means, switching means for connecting said display means to said circuits sequentially, and means responsive to the switching means and the mirror oscillating means for indicating on the display means the position of a source of radiation.

References Cited

UNITED STATES PATENTS

| | | | |
|---|---|---|---|
| 2,403,066 | 7/1946 | Evans | 250—83.3 |
| 2,413,349 | 12/1946 | Hancock et al. | |
| 2,423,885 | 7/1147 | Hammond | 244—14 |
| 2,713,134 | 7/1955 | Eckweiler | 244—14 |
| 2,856,531 | 10/1958 | Brouwer | 250—83.3 X |
| 2,873,381 | 2/1959 | Lauroesch | 250—83.3 X |
| 2,878,396 | 3/1959 | Behm | 88—1 |
| 2,882,416 | 4/1959 | Fairbanks et al. | 250—83.3 |
| 2,895,049 | 7/1959 | Astheimer et al. | 250—83.3 |
| 2,968,735 | 1/1961 | Kaufold et al. | 250—203 |
| 2,981,842 | 4/1961 | Kaufold et al. | 250—83.3 |

ARCHIE R. BORCHELT, *Primary Examiner.*

RALPH G. NILSON, CHESTER L. JUSTUS, MAYNARD R. WILBUR, *Examiners.*

D. G. BREKKE, *Assistant Examiner.*